United States Patent
Tamura et al.

(10) Patent No.: US 10,193,136 B2
(45) Date of Patent: Jan. 29, 2019

(54) NONAQUEOUS ELECTROLYTE SECONDARY BATTERY

(71) Applicant: Automotive Energy Supply Corporation, Zama-Shi, Kanagawa (JP)

(72) Inventors: Hidetoshi Tamura, Zama (JP); Hiroshi Yageta, Zama (JP)

(73) Assignee: AUTOMOTIVE ENERGY SUPPLY CORPORATION, Zama-Shi, Kanagawa (JP)

(*) Notice: Subject to any disclaimer, the term of this patent is extended or adjusted under 35 U.S.C. 154(b) by 0 days.

(21) Appl. No.: 15/097,682

(22) Filed: Apr. 13, 2016

(65) Prior Publication Data
US 2016/0315312 A1    Oct. 27, 2016

(30) Foreign Application Priority Data
Apr. 24, 2015  (JP) ................. 2015-089117

(51) Int. Cl.
*H01M 4/525*   (2010.01)
*H01M 4/131*   (2010.01)
(Continued)

(52) U.S. Cl.
CPC ........... *H01M 4/131* (2013.01); *H01M 2/024* (2013.01); *H01M 2/0275* (2013.01);
(Continued)

(58) Field of Classification Search
None
See application file for complete search history.

(56) References Cited

U.S. PATENT DOCUMENTS

| 8,728,666 B2 | 5/2014 | Itou et al. | |
| 2004/0175611 A1* | 9/2004 | Otohata ............... | H01M 2/021 429/127 |

(Continued)

FOREIGN PATENT DOCUMENTS

| EP | 2704236 A2 | 3/2014 |
| JP | 2006253119 A | 9/2006 |
| JP | 2013232318 A | 11/2013 |
| WO | 2006/118279 A1 | 11/2006 |

OTHER PUBLICATIONS

Extended European Search Report dated Jun. 14, 2016 for the corresponding European Patent Application No. 16165161.7.
(Continued)

*Primary Examiner* — Wojciech Haske
(74) *Attorney, Agent, or Firm* — Troutman Sanders LLP

(57) ABSTRACT

Provided is a nonaqueous electrolyte secondary battery that includes a laminate film exterior container housing an electrode body and an electrolyte solution. In the nonaqueous electrolyte secondary battery, the electrode body includes a positive electrode, a negative electrode, and a separator. The positive electrode includes a positive electrode active material layer formed on a positive electrode current collector. The negative electrode includes a negative electrode active material layer formed on a negative electrode current collector. The positive electrode active material layer includes secondary particles of a lithium nickel cobalt manganese composite oxide. The secondary particle includes a group of primary particles of a lithium nickel cobalt manganese composite oxide with a layered crystal structure. The primary particle has a cross-sectional area of 1.50 $\mu m^2$ or less. The layered crystal structure has a lattice constant "c" of 14.240 Å or less.

5 Claims, 4 Drawing Sheets

(51) Int. Cl.

| | | |
|---|---|---|
| *H01M 2/02* | (2006.01) | |
| *H01M 10/0525* | (2010.01) | |
| *H01M 4/133* | (2010.01) | |
| *H01M 4/505* | (2010.01) | |
| *H01M 4/587* | (2010.01) | |
| *H01M 4/62* | (2006.01) | |
| *H01M 4/66* | (2006.01) | |
| *H01M 10/0568* | (2010.01) | |
| *H01M 10/0569* | (2010.01) | |
| *H01M 10/0585* | (2010.01) | |
| *H01M 4/02* | (2006.01) | |

(52) U.S. Cl.
CPC ........... *H01M 4/133* (2013.01); *H01M 4/505* (2013.01); *H01M 4/525* (2013.01); *H01M 4/587* (2013.01); *H01M 4/623* (2013.01); *H01M 4/625* (2013.01); *H01M 4/661* (2013.01); *H01M 10/0525* (2013.01); *H01M 10/0568* (2013.01); *H01M 10/0569* (2013.01); *H01M 10/0585* (2013.01); *H01M 2004/021* (2013.01); *H01M 2004/027* (2013.01); *H01M 2004/028* (2013.01); *H01M 2220/20* (2013.01); *Y02T 10/7011* (2013.01)

(56) References Cited

U.S. PATENT DOCUMENTS

| | | | |
|---|---|---|---|
| 2005/0069777 A1* | 3/2005 | Takami | H01M 2/0275 429/245 |
| 2009/0011334 A1* | 1/2009 | Shizuka | H01M 4/131 429/223 |
| 2009/0029253 A1 | 1/2009 | Itou et al. | |
| 2014/0045067 A1 | 2/2014 | Cho et al. | |
| 2015/0093641 A1 | 4/2015 | Mitsumoto et al. | |

OTHER PUBLICATIONS

Kuichen Wu et al: "Effect of precursor and synthesis temperature on the structural and electrochemical properties of Li(Ni0.5Co0.2Mn0.3)O2", Electrochemica Acta, Elsevier Science Publishers, Barking, GB, vol. 75, May 8, 2012 (May 8, 2012), pp. 393-398, XP028492608, ISSN: 0013-4686, DOI: 10.1016/J.LECTACTA.2012.05.035.

Luo W et al: "Synthesis, Characterization, and Thermal Stability of LiNi1/3Mn1/3CO1/3—zMgzO2, LiNi1/3—zMn1/3Co1/3MgzO2, and LiNi1/3Mn1/3—zCo1/3MgzO2", Chemistry of Materials, American Chemical Society, US, vol. 22, No. 3, Mar. 1, 2010 (Mar. 1, 2010), pp. 1164-1172, XP002657129, ISSN: 0897-4756, DOI: 10.1021/CM902593N.

* cited by examiner

PARTICLE 1   PARTICLE 2

US 10,193,136 B2

NONAQUEOUS ELECTROLYTE SECONDARY BATTERY

CROSS-REFERENCE TO RELATED APPLICATION

This application claims priority from Japanese Patent Application No. 2015-089117 filed with the Japan Patent Office on Apr. 24, 2015, the entire content of which is hereby incorporated by reference.

BACKGROUND

1. Technical Field

The present disclosure relates to a nonaqueous electrolyte secondary battery.

2. Related Art

In recent years, vehicles utilizing electric energy, such as electric vehicles and hybrid vehicles, have been put into practical use. Along with the development for the higher performance of such vehicles, the development for secondary batteries as the driving power source has been advanced. In particular, a nonaqueous electrolyte secondary battery such as a lithium ion secondary battery has been expected for its characteristics of high output, high capacity (high energy density), and long life.

The nonaqueous electrolyte secondary battery has been required to have small weight and thickness. More and more nonaqueous electrolyte secondary batteries have come to have a package formed of a laminate film instead of a metal can. The laminate film can have small weight and thickness and the processing of the laminate film is easy.

Various examinations have been conducted for improving the performance of the nonaqueous electrolyte secondary batteries. For example, WO 2006/118279 A has disclosed the positive electrode material for a lithium ion battery, which includes secondary particles including primary particles of lithium nickel composite oxide with a different length horizontally and vertically (an aspect ratio of not 1). Here, the vertical direction (longitudinal direction) of at least some primary particles is toward the center of the secondary particle. According to WO 2006/118279 A, the positive electrode material allows fewer cracks of the secondary particles in the discharging cycle at high temperature and with high output.

JP-A-2013-232318 has disclosed the lithium metal composite oxide with a layer structure. The $D_{50}$ of this composite oxide is more than 4 μm and less than 20 μm, and the area ratio of the primary particle to the secondary particle (primary particle area/secondary particle area) of this composite oxide is in the range of 0.004 to 0.035. The minimum value of the powder crushing strength is more than 70 Ma. According to this patent literature, the lithium secondary battery including this composite oxide as the positive electrode material has the excellent life characteristic, initial charging and discharging characteristic, and slurry characteristic.

JP-A-2006-253119 has disclosed the lithium nickel manganese cobalt composite oxide powder with a layered crystal structure and a particular composition. Of the crystal structure in this patent literature, the lattice constants "a" and "c" satisfy 2.855 Å≤a≤2.870 Å and 14.235 Å≤c≤14.265 Å. According to this patent literature, using this powder as the positive electrode material for the lithium secondary battery leads to the lower cost, the higher withstanding voltage, the higher safety, and the higher battery performance.

SUMMARY

A nonaqueous electrolyte secondary battery according to an embodiment of the present disclosure includes: an electrode body; an electrolyte solution; and a laminate film package container housing the electrode body and the electrolyte solution. In the nonaqueous electrolyte secondary battery, the electrode body includes a positive electrode a negative electrode, and a separator disposed between the positive electrode and the negative electrode. The positive electrode includes a positive electrode current collector, and a positive electrode active material layer formed on the positive electrode current collector. The negative electrode includes a negative electrode current collector, and a negative electrode active material layer formed on the negative electrode current collector. The positive electrode active material layer includes secondary particles of a lithium nickel cobalt manganese composite oxide. The secondary particle includes a group of primary particles of a lithium nickel cobalt manganese composite oxide with a layered crystal structure. The primary particle has a cross-sectional area of 1.50 μm² or less. The layered crystal structure has a lattice constant "c" of 14.240 Å or less.

DETAILED DESCRIPTION

Figure 1:
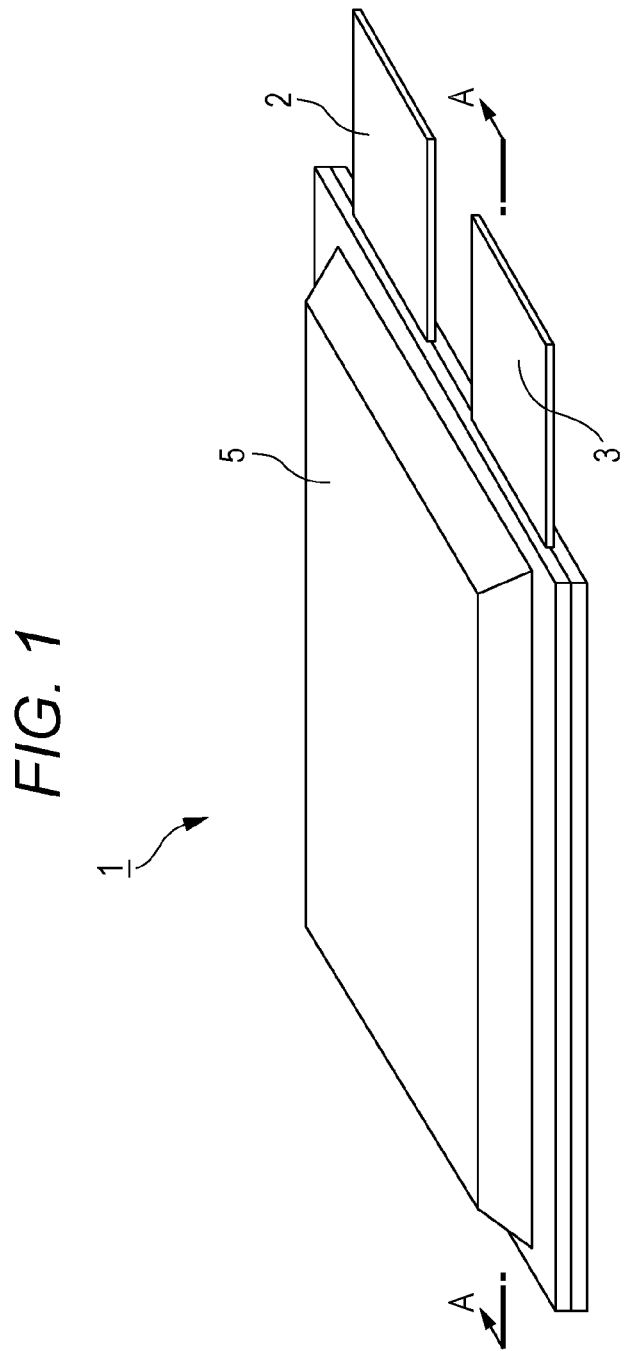
FIG. 1 is a perspective view illustrating a structure of a nonaqueous electrolyte secondary battery according to one embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A nonaqueous electrolyte secondary battery including a lithium nickel cobalt manganese composite oxide as the positive electrode material has a package container. If the package container includes a laminate film, the force of the package container to press an electrode body is small. Because the pressing force is small, the progress of the cycle results in the crack of the active material particle or easy deterioration in cycle. An objective of the present disclosure is to provide a nonaqueous electrolyte secondary battery with the cycle characteristics improved.

According to an aspect of the present disclosure, provided is a nonaqueous electrolyte secondary battery that includes an electrode body, an electrolyte solution, and a laminate film package container housing the electrode body and the electrolyte solution. The electrode body includes a positive electrode, a negative electrode, and a separator disposed between the positive electrode and the negative electrode. The positive electrode includes a positive electrode current collector, and a positive electrode active material layer formed on the positive electrode current collector. The negative electrode includes a negative electrode current collector, and a negative electrode active material layer formed on the negative electrode current collector. The positive electrode active material layer includes a secondary particle of a lithium nickel cobalt manganese composite oxide. The secondary particle includes a group of primary particles of a lithium nickel cobalt manganese composite oxide with a layered crystal structure. The primary particle has a cross-sectional area of 1.50 µm² or less. The layered crystal structure has a lattice constant "c" of 14.240 Å or less.

According to an embodiment of the present disclosure, a nonaqueous electrolyte secondary battery with the improved cycle characteristics can be provided.

A preferred embodiment of the present disclosure will be described below.

First, a structure of a nonaqueous electrolyte secondary battery according to the embodiment of the present disclosure is described with reference to the drawings. Here, an example of a lithium ion secondary battery is described. FIG. 1 is a perspective view of a battery 1, and FIG. 2 is a sectional view along the line A-A of FIG. 1.

As illustrated in FIG. 1, the battery 1 has a flat and rectangular parallelepiped external shape. A pair of terminals 2 and 3 protrudes from one edge of the battery 1 in a longitudinal direction.

Figure 2:
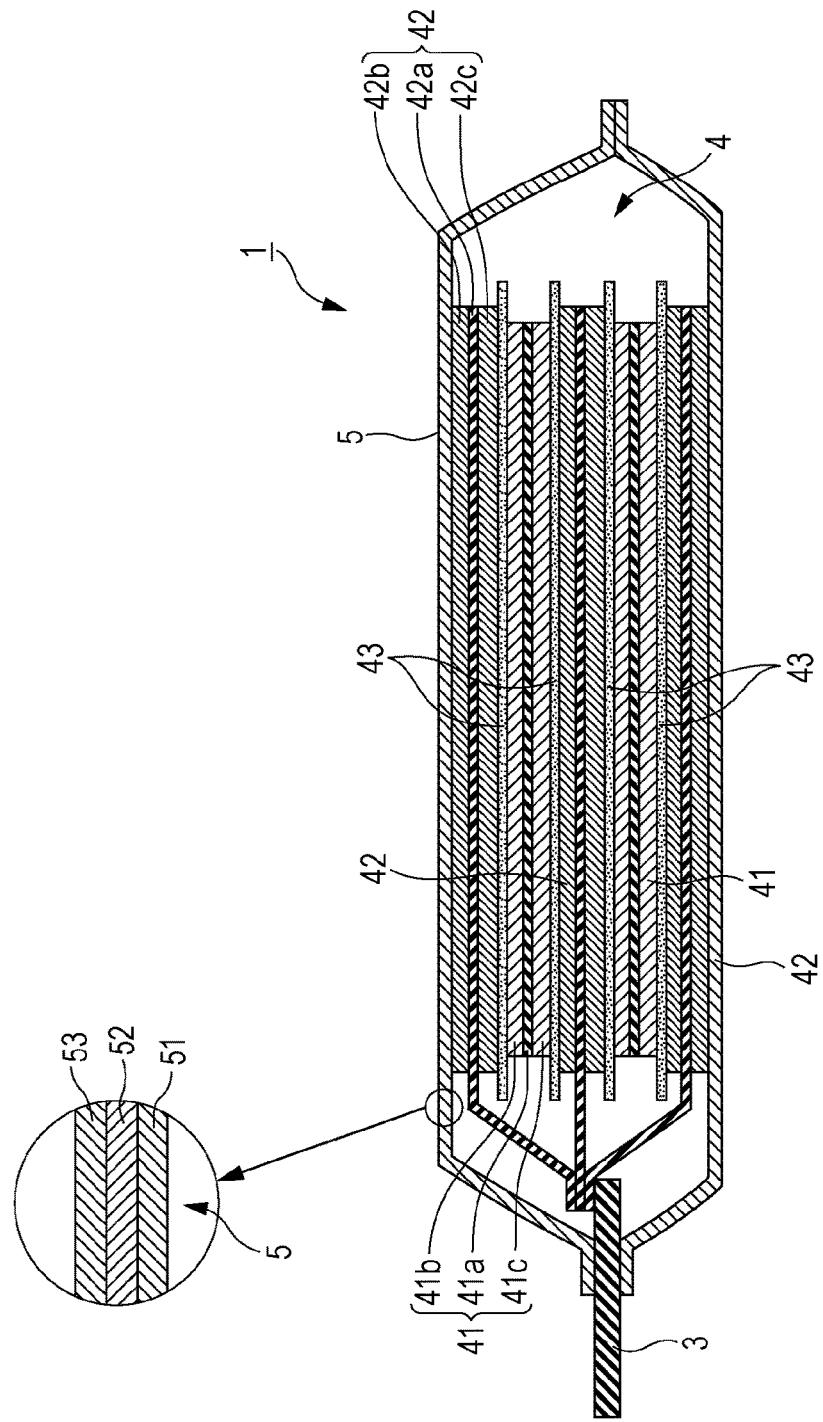
FIG. 2 is a sectional view illustrating a structure of a nonaqueous electrolyte secondary battery according to one embodiment of the present disclosure (taken along line A-A of FIG. 1)

As illustrated in FIG. 2, a power generating element 4 including positive electrode plates 41 and negative electrode plates 42, each plate 41 and each plate 42 being stacked with a separator 43 interposed therebetween, and an electrolyte solution are housed in a package container including a package 5. Specifically, the battery 1 includes three negative electrode plates 42, two positive electrode plates 41, and four separators 43 each interposed between the negative electrode plate 42 and the positive electrode plate 41. That is, in this example, the negative electrode plate 42 is located as each of two outermost layers of the power generating element 4. However, the power generating element may alternatively be configured so that the positive electrode plate 41 comes to the outermost layer of the power generating element 4. The size of each component in FIGS. 1 and 2 may be exaggerated for the explanation.

The positive electrode plate 41 is obtained by forming a positive electrode active material layer 41b on one surface of a rectangular positive electrode current collector 41a, and a positive electrode active material layer 41c on the other surface of the rectangular positive electrode current collector 41a. Examples of the positive electrode current collector 41a include a positive electrode current collector formed of an electrochemically stable metal foil such as an aluminum foil, an aluminum alloy foil, a copper foil, or a nickel foil.

The negative electrode plate 42 is obtained by forming a negative electrode active material layer 42b on one surface of a rectangular negative electrode current collector 42a, and a negative electrode active material layer 42c on the other surface of the rectangular negative electrode current collector 42a. Examples of the negative electrode current collector 42a include a negative electrode current collector formed of an electrochemically stable metal foil such as a nickel foil, a copper foil, a stainless steel foil, or an iron foil.

A part of the edge of the negative electrode current collector 42a in the longitudinal direction extends as an extension part not having the negative electrode active material layer. An end of the extension part is bonded to a negative electrode terminal 3. Although not illustrated in FIG. 2, a part of the edge of the positive electrode current collector 41a in the longitudinal direction similarly extends as an extension part that does not have the positive electrode active material layer. An end of the extension part is bonded to a positive electrode terminal 2.

The thickness of each of the positive electrode current collector and the negative electrode current collector is usually set in the range of 1 to 100 µm.

The separator 43 prevents the short-circuiting between the positive electrode plate 41 and the negative electrode plate 42, and holds the electrolyte solution. Examples of the separator 43 that can be used include a microporous film formed of polyolefin such as polyethylene (PE) or polypropylene (PP). The separator 43 is not limited to a single layer film of polyolefin or the like. The separator may alternatively have a three-layer structure having a polypropylene film held between polyethylene films, or be formed by stacking a polyolefin microporous film and an inorganic microparticle porous film. The thickness of the separator can be set in the range of, for example, 4 to 60 µm.

The package 5 houses the power generating element 4 together with the electrolyte solution. The package 5 is formed by, for example, the laminate film as magnified in FIG. 2. This laminate film includes a metal layer 52 (for example, aluminum layer or the like), a heat-seal layer 51 with an insulating property that can be heat-sealed and that covers one surface of the metal layer (surface of the metal layer 52 on the side where the package 5 houses the power generating element 4), and a protective layer 53 that covers the other surface of the metal layer (outer surface of the package 5). The heat-seal layer 51 is formed of, for example, synthetic resin that can be heat-sealed, such as polypropylene. The protective layer 53 is formed of, for example, synthetic resin with excellent durability, such as polyethylene terephthalate (PET). The preferred thickness of the metal layer 52 is 20 µm to 50 µm. The preferred thickness of the heat-seal layer 51 is 30 µm to 100 µm. The preferred thickness of the protective layer 53 is 10 µm to 50 µm. The structure of the laminate film is not limited to the structure including the metal layer 52 and the synthetic resin layers 51 and 53 formed on the surface of the metal layer 52. For example, the structure of the package 5 may include the synthetic resin layer provided for only the side where the package 5 houses the power generating element 4.

The package 5 is formed by, for example, a laminate film disposed opposite to one major surface of the power generating element 4 illustrated in FIG. 2, and a laminate film disposed opposite to the other major surface thereof. Four sides of the two laminate films are overlapped on each other and heat-sealed, whereby a package container including the package 5 is formed. Note that the package container may alternatively be formed by disposing the power generating element 4 inside the two-folded laminate film, overlapping three sides of the laminate film on each other, and then heat-sealing the overlapped sides.

As illustrated in FIG. 1, a pair of terminals 2 and 3 positioned on the short side of the battery 1 is extracted to the outside through the bonding surface of the package 5 when the package 5 is heat-sealed. In FIG. 1, the pair of terminals 2 and 3 is disposed side by side on the same edge. Alternatively, the positive electrode terminal 2 may be disposed on one edge and the negative electrode terminal 3 may be disposed on the other edge.

The components of the secondary battery are hereinafter described in more detail.

(Positive Electrode Active Material Layer)

The positive electrode active material layer includes the positive electrode active material and binder, and may further include a conductive agent and other additives.

The positive electrode active material includes a lithium nickel cobalt manganese composite oxide with a layered crystal structure (hereinafter referred to as "NCM positive electrode active material").

The NCM positive electrode active material includes a secondary particle formed by a group of primary particles of the NCM positive electrode active material. The sectional area of the primary particle (hereinafter referred to as "primary particle area") is 1.50 μm² or less. The lattice constant "c" of the layered crystal structure is 14.240 Å or less. The unit lattice volume of the layered crystal structure is preferably 101.60 Å³ or less.

The primary particle area of the NCM positive electrode active material is preferably in the range of 0.30 μm² or more and 1.50 μm² or less, more preferably 0.60 μm² or more and 1.30 μm² or less, and more preferably 0.70 μm² or more and 1.20 μm² or less. The battery including the NCM positive electrode active material with too large primary particle area may have lower capacity retention. The primary particle area is therefore preferably in the above range. On the other hand, the battery including the NCM positive electrode active material with too small primary particle area may, in the manufacture of the active material, react at lower temperature or in a shorter time. As a result, the chemical reaction to synthesize the active material is insufficient. The insufficient reaction may result in the lower material quality. Therefore, the primary particle area is preferably in the above range.

The primary particle area of the NCM positive electrode active material can be determined by the measurement method to be described in the example below.

The lattice constant "a" of the layered crystal structure of the NCM positive electrode active material is preferably 2.865 Å or more and 2.870 Å or less. The lattice constant "c" of the layered crystal structure of the NCM positive electrode active material is preferably 14.226 Å or more and 14.240 Å or less.

The unit lattice volume of the layered crystal structure of the NCM positive electrode active material is preferably 101.20 Å³ or more and 101.60 Å³ or less. The numeral of the unit lattice volume herein described is the value calculated by the following formula:

Unit lattice volume (Å³)=(√3/2)·$a^2$·c  [Formula 1]

The lattice constants "a" and "c" of the layered crystal structure of the NCM positive electrode active material can be determined based on the X-ray crystal structure analysis (powder XRD).

The secondary battery including the positive electrode active material with a lattice constant "c" of more than 14.240 Å (or a unit lattice volume of more than 101.60 Å) may have lower capacity retention. Therefore, the lattice constant "c" (or additionally unit lattice volume) is preferably in the above range.

The positive electrode active material may include other positive electrode active material than the NCM positive electrode active material. Preferably, however, the NCM positive electrode active material constitutes a main component of the positive electrode active material. The positive electrode active material contains the NCM positive electrode active material preferably by more than 50 mass %, more preferably by 60 mass % or more, more preferably by 70 mass % or more and particularly preferably by 90 mass % or more.

The NCM positive electrode active material is preferably represented by the following Formula (1):

$Li_{1-x}Ni_aCo_bMn_cO_2$  (1)

(where "x" satisfies 0≤x≤1, "a" satisfies 0.4≤a≤0.8, "b" satisfies 0.1≤b≤0.4, and "c" satisfies 0.1≤c≤0.5.)

In Formula (1), when the Ni composition ratio "a" is 0.4 or more, the sufficient charging and discharging capacity can be achieved. Moreover, when the Co composition ratio "b" is suppressed, the material cost can be suppressed.

When the Ni composition ratio "b" is too high over 0.8, the charging and discharging capacity is increased but the charging and discharging more largely changes the crystal structure, so that the active material particle is easily cracked. From the viewpoint of achieving the sufficient charging and discharging capacity while suppressing the crack of the active material particle (while achieving the sufficient cycle characteristics), the Ni composition ratio "b" is preferably 0.8 or less.

When the Mn composition ratio "c" is too high over 0.5, the NCM positive electrode active material easily has the spinel crystal structure. Therefore, in order to achieve the intended layer compound, the Mn composition ratio "c" is preferably 0.5 or less.

The average particle diameter of the positive electrode active material is preferably 0.1 to 50 μm, more preferably 1 to 30 μm, and much more preferably 2 to 25 μm from the viewpoint of, for example, the reactivity with the electrolyte solution and the rate characteristics. The average particle diameter of the positive electrode active material A and the positive electrode active material B is preferably 0.1 to 50 μm, more preferably 1 to 30 μm, and much more preferably 2 to 25 μm. Here, the average particle diameter refers to the particle size (medium size: $D_{50}$) at the integrated value 50% in the particle size distribution (based on volume) according to the laser diffraction method.

Examples of the binder for the positive electrode to be used include binder generally used for the positive electrode, such as polytetrafluoroethylene (PTFE) and polyvinylidene fluoride (PVDF).

The binder is contained in the positive electrode active material layer by preferably 1 to 10 mass %, more preferably 1 to 5 mass %, and much more preferably 2 to 4 mass %. When the amount of binder contained is sufficient, the deterioration of the active material layer can be suppressed in the application for the vehicles or the like where the vibration resistance is required. If the amount of binder contained is excessive, the energy density is decreased and the resistance is increased, so that the transfer of lithium ions in the positive electrode active material layer may become difficult.

Examples of the conductive agent for the positive electrode active material layer to be used include conductive materials generally used as the conductive agent, for example, carbon materials such as carbon black, Ketjen black, and acetylene black. The amount of conductive agent in the positive electrode active material layer can be set in the range of, for example, 1 to 10 mass %.

Examples of other additives for the positive electrode active material layer include compounds for increasing the ion conductivity, such as conductive polymers, for example, polyethylene oxide polymer and polypropylene oxide polymer.

The thickness of the positive electrode active material layer on one side of the current collector is preferably 50 to 100 μm, more preferably 70 to 90 μm. The large thickness is advantageous in point of capacity. However, too large film thickness tends to be disadvantageous in point of input/output characteristics.

The film density of the positive electrode active material layer is set in the range of preferably 2.8 to 3.1 g/cm$^3$, more preferably 2.8 to 3.0 g/cm$^3$ or 2.9 to 3.1 g/cm$^3$, and much more preferably 2.9 to 3.0 g/cm$^3$. The large film density is advantageous in point of capacity. However, too large film density tends to be disadvantageous in point of input/output characteristics. The porosity of the positive electrode active material layer is preferably 20 to 30%. The large porosity is advantageous in point of input/output characteristics. However, too large film porosity leads to the low capacity.

The positive electrode active material layer can be formed as below, for example. First, a slurry including the positive electrode active material, the binder, and the solvent (and conductive agent, if necessary) is prepared. The slurry is applied onto the positive electrode current collector. The applied slurry is dried and pressed if necessary, thereby forming the positive electrode active material layer. The slurry solvent used in the manufacture of the positive electrode may be N-methyl-2-pyrrolidone (NMP).

(Negative Electrode Active Material Layer)

The negative electrode active material layer includes the positive electrode active material and the binder, and may further include the conductive agent and other additives.

As the negative electrode active material, a graphite material may be used. Examples of the graphite material include natural graphite, synthetic graphite, and coated graphite. Other examples of the negative electrode active material include amorphous carbon such as a non-graphitizable carbon material and a graphitizable carbon material, carbonaceous materials such as diamond-like carbon, fullerene, carbon nanotube, and carbon nanohorn, a metal that can form alloy with lithium, an oxide containing such metal, and a lithium-metal composite oxide. The content ratio of the graphite material relative to the entire negative electrode active material is preferably 90 mass % or more (90 to 100 mass %), more preferably 95 mass % or more (95 to 100 mass %), much more preferably 98 mass % or more (98 to 100 mass %), and particularly preferably 100 mass %.

In order to suppress the decrease in charging and discharging efficiency by suppressing the side reaction, the average particle diameter of the negative electrode active material is preferably 1 μm or more, more preferably 2 μm or more, and much more preferably 5 μm or more. Moreover, the average particle diameter is preferably 80 μm or less, more preferably 40 μm or less, from the perspectives of the input/output characteristics and the manufacture of the electrode (flatness of the electrode surface, etc.). Here, the average particle diameter refers to the particle size (medium size: $D_{50}$) at the integrated value 50% in the particle size distribution (based on volume) according to the laser diffraction method.

The graphite material is preferably coated graphite because the excellent input/output characteristics can be obtained and the gas generation can be suppressed. Moreover, the graphite material that is preferable from the viewpoints of capacity and cost is coated natural graphite including natural graphite as the core material.

The coated graphite is the graphite material obtained by coating the surface of the graphite particle with the amorphous or low-crystalline non-graphite carbon material. As long as the desired characteristics can be obtained, it is not necessary that the surface of the graphite particle is entirely coated and at least a part of the graphite particle may be coated. The amount of coating is preferably 10 vol % or less, more preferably 5 vol % or less, and much more preferably 2 vol % or less relative to the volume of the entire coated graphite.

The binder may be polyvinylidene fluoride or an aqueous binder. The aqueous binder is the binder that can be dissolved in or dispersed with water. Examples of the aqueous binder include thermoplastic resin, polymer compounds with rubber elasticity (rubber polymer, for example, styrene-butadiene rubber), and water-soluble polymers (for example, carboxymethyl cellulose). Two or more kinds thereof may be mixed to be used. Examples of the binder that can be dispersed with water include polymer compounds emulsified in latex, emulsion, or water and polymer compounds suspended in water.

The conductive agent for the negative electrode active material layer may be the conductive material that is generally used as the conductive agent, such as carbon materials including carbon black, Ketjen black, and acetylene black. The amount of conductive agent in the negative electrode active material layer can be set to, for example, 1 to 10 mass %.

The negative electrode active material may alternatively non-graphitizable carbon, an active material including silicon, an active material including lithium titanate, or the like.

The thickness of the negative electrode active material layer on one side of the current collector is preferably 40 to 80 μm, more preferably 50 to 70 μm. The large thickness is advantageous in point of capacity. On the other hand, the film thickness exceeding the above range is disadvantageous in point of the input/output characteristics.

The negative electrode active material layer can be formed as below, for example. First, a slurry including the negative electrode active material, the binder, and the solvent is prepared. The slurry is applied onto the negative electrode current collector. The applied slurry is dried and pressed as necessary, thereby forming the negative electrode.

(Relation Between Capacity of Positive Electrode Active Material Layer and Capacity of Negative Electrode Active Material Layer)

The ratio ($C_A/C_C$) of the charging capacity $C_A$ per unit area of the negative electrode active material layer to the charging capacity $C_C$ per unit area of the positive electrode active material layer between a pair of opposite positive electrode active material layer and negative electrode active material layer is preferably 1 or more, more preferably 1.1 or more from the viewpoint of preventing the separation of lithium. On the other hand, from the viewpoint of reducing the excessive negative electrode active material, the preferable ratio is 1.3 or less. Here, the unit area includes the unit area of the surface of the positive electrode active material layer opposite to the negative electrode active material layer, and the unit area of the surface of the negative electrode active material layer opposite to the positive electrode active material layer.

The charging capacity $C_C$ per unit area of the positive electrode active material layer and the charging capacity $C_A$ per unit area of the negative electrode active material layer can be measured based on a general method using a coin cell.

(Electrolyte Solution)

A preferred example of the electrolyte solution to be used for the secondary battery according to the embodiment of the present disclosure is a nonaqueous electrolyte solution obtained by dissolving the lithium salt in an organic solvent.

The organic solvent may be an aprotic solvent such as cyclic carbonate, linear carbonate, carboxylic acid ester, or ethers. Examples of the cyclic carbonate include ethylene carbonate, propylene carbonate, and fluoroethylene carbonate. Examples of the linear carbonate include dimethyl carbonate, diethyl carbonate, and ethyl methyl carbonate. The cyclic carbonate and the linear carbonate can be used in combination. Alternatively, another organic solvent can be mixed.

Examples of the lithium salt include $LiPF_6$, $LiBF_4$, $LiCF_3SO_3$, $LiC_4F_9SO_3$, $LiN(CF_3SO_2)_2$, and $LiC(CF_3SO_2)_3$. The concentration of the lithium salt is set to 0.8 to 1.2 mol/L, preferably 0.9 to 1.1 mol/L. The sufficiently high concentration of lithium salt is advantageous in improving the low-temperature characteristics. If the concentration of lithium salt is too high over the above range, however, the viscosity of the electrolyte solution tends to increase. In order to secure the permeability into the pores of the positive electrode and the negative electrode, the lithium salt concentration is preferably set within the above range.

The electrolyte solution may contain an additive. The additive can preferably form a film derived from the additive on the surface of the negative electrode active material. Examples of the additive include carbonate additives such as vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinylethylene carbonate (VEC), divinylethylene carbonate and other carbonates with the unsaturated bond, and halogenated carbonates whose hydrogen atoms are partly replaced by fluorine atoms such as ethylene carbonate and propylene carbonate. Other examples include sulfur additives such as sultone, for example propane sultone, linear or cyclic sulfonic acid ester, and linear or cyclic disulfonic acid ester. Among these, preferred examples are vinylene carbonate, vinylethylene carbonate, divinylethylene carbonate, sultone, cyclic sulfonic acid ester, cyclic disulfonic acid ester, and fluoroethylene carbonate. Any of these additives may be used alone, or two or more kinds thereof may be used in combination. The additive preferably contains at least the sulfur additive as a necessary component. The concentration of additive in the electrolyte solution is preferably 0.1 mass % to 5 mass %, preferably 0.5 to 2.5 mass %. These additives can contribute to the improvement of the cycle characteristics. However, if the additive is contained too much, the increase in DC resistance may be concerned.

EXAMPLES

The present disclosure will be further described with reference to Examples and Comparative Examples.

(Preparation of Positive Electrode Active Material Powder)

A precursor with a predetermined element ratio was formed using $NiSO_4 \cdot 6H_2O$ (Wako Pure Chemical Industries, Ltd.), $MnSO_4 \cdot 5H_2O$ (KANTO KAGAKU), and $CoSO_4 \cdot 7H_2O$ (KANTO KAGAKU). After that, the precursor was mixed with $Li_2Co_3$ (Honjo Chemical), and this mixture was burned at 600 to 900° C. for 12 to 48 hours. The burned product was pulverized. With a sieve of 50 μm mesh, rough particles were removed from the pulverized product. Thus, the powder of the NCM positive electrode active material was obtained.

Through the X-ray diffraction measurement, it has been confirmed that the obtained powder is in a single phase.

The size of the primary particle (size of the primary particle area) was controlled by adjusting the burning temperature and the length of burning time. The particle growth of the primary particle is promoted as more heat is applied. The amount of heat is the product of the burning temperature and the length of burning time. As more heat is applied, the primary particle grows so that the primary particle area tends to increase. The lattice constant can be controlled by adjusting the amount of preparing lithium compound (lithium carbonate or the like) in addition to adjusting the burning temperature and the length of burning time.

Example 1

The positive electrode was manufactured by the procedure below. Through the above preparing procedure, the powder of the NCM positive electrode active material $(Li_{1-x}Ni_aCo_bMn_cO_2$, where x=0, a=0.5, b=0.2, c=0.3) was prepared. To this positive electrode active material, polyvinylidene fluoride as the binder and carbon black powder as the conductive agent were added at a predetermined proportion. This mixture was dispersed uniformly in the solvent N-methyl-2-pyrrolidone (NMP), thereby preparing a slurry. The obtained slurry was applied on a 20-μm-thick aluminum foil as a positive electrode current collector. After that, NMP was vaporized to form the positive electrode active material layer on one surface of the positive electrode current collector. The binder was contained in the positive electrode active material layer (layer formed on one surface of the current collector) by 4 mass %. Similarly, the positive electrode active material layer was formed on the other surface of the positive electrode current collector. After that, the positive electrode active material layer was pressed, thereby providing the targeted positive electrode plate. The thickness of the pressed positive electrode active material layer was 52 μm (thickness on one surface side), the film density thereof was 3.2 (g/cm$^3$), and the porosity thereof was 24%.

The negative electrode was manufactured as below. Spherical natural graphite powder coated with amorphous carbon as the negative electrode active material, polyvinylidene fluoride as the fluorine resin binder, and carbon black as the conductive auxiliary agent were added to N-methyl-2-pyrrolidone (NMP). The mixture was then stirred to prepare a slurry having these materials uniformly dispersed in NMP. The obtained slurry was applied onto a 10-μm-thick copper foil to serve as the negative electrode current collector. After that, heat was applied to vaporize the solvent. Thus, the negative electrode active material layer was formed on one surface of the negative electrode current collector. Similarly, the negative electrode active material layer was formed on the other surface of the negative electrode current collector. After that, the negative electrode active material layer was pressed to provide the intended negative electrode plate.

The thicknesses of the positive and negative electrodes were designed so that the ratio ($C_A/C_C$) of the charging capacity $C_A$ per unit area of the negative electrode plate to the charging capacity $C_C$ per unit area of the positive electrode plate became 1.2. The charging capacity was obtained by measuring the initial charging capacity at a rate of 0.05 C using a coil cell with a counter electrode formed of lithium metal.

The positive electrode plate and the negative electrode plate were cut, while leaving the current collector extension parts where the active material was not applied. Thus, the positive electrode plate and the negative electrode plate with a predetermined size were obtained.

Next, the positive electrode plate (one plate), the negative electrode plates (two plates), and the separators formed of polyethylene and polypropylene were alternately stacked so that the positive electrode active material layer and the negative electrode active material layer were disposed opposite to each other and overlapped on each other. Thus, the power generating element was obtained.

Next, an inward end (one end portion) of the negative electrode terminal was bonded to the extension part of the negative electrode current collector of the negative electrode plate. Similarly, an inward end (one end portion) of the positive electrode terminal was bonded to the extension part of the positive electrode current collector of the positive electrode plate. This power generating element was covered with the laminate film constituting the package. Next, four sides around the package were heat-sealed leaving a relatively small filling port. Thus, the package container including the power generating element was formed. After that, the electrolyte solution described below was poured through the filling port and then the pressure in the package container was reduced. After that, the filling port was heat-sealed, thereby hermetically sealing the package container. The laminate film was heat-sealed in a state that the positive electrode terminal and the negative electrode terminal were extracted from one of the four sides of the package container. The distance between the heat-sealed portion and the power generating element was 15 mm at the side where the terminals were extracted and 5 mm at the other sides (regardless of the sealing width).

As the electrolyte solution, the solution containing 1 mol/L of $LiPF_6$ as the electrolyte salt, the mixed solvent of ethylene carbonate and diethyl carbonate (volume ratio 30:70, and cyclic carbonate/linear carbonate=30/70) as the solvent was used.

Example 2

A battery according to Example 2 was manufactured through the same procedure as that of Example 1 except that the NCM positive electrode active material had the primary particle area, the lattice constant "a", and the lattice constant "c" shown in Table 1.

Comparative Example 1

A battery according to Comparative Example 1 was manufactured through the same procedure as that of Example 1 except that the NCM positive electrode active material had the primary particle area, the lattice constant "a", and the lattice constant "c" shown in Table 1.

Comparative Example 2

A battery according to Comparative Example 2 was manufactured through the same procedure as that of Example 1 except that the NCM positive electrode active material had the primary particle area, the lattice constant "a", and the lattice constant "c" shown in Table 1.

(Capacity Retention)

In a thermostat chamber with a temperature maintained at 55° C., the temperature of the battery was set to 55° C. and then the battery was charged with constant current (CC) up to 4.15 V at a current rate of 1 C or 0.2 C. After that, the battery was charged at constant voltage (CV) for 2.5 hours in total. After a rest for 10 minutes, the battery was discharged to 3.0 V at a current rate of 1 C or 0.2 C and then rested again for 10 minutes. This is considered as one cycle in the charging and discharging cycle test. The discharging capacity after 500 cycles relative to the initial discharging capacity is defined as the capacity retention (%). The capacity retention was obtained through the charging and discharging test as above with respect to the batteries in Examples and Comparative Example. The results are shown in Table 1.

(Primary Particle Area/Observation of Cross Section of Active Material Particle)

The primary particle area of the NCM positive electrode active material was measured through the observation of the cross section using the electron microscope (KEYENCE, product name: VE-9800). First, the cross section of the electrode including the NCM positive electrode active material particle was presented using the ion milling system (Hitachi High-Technologies Corporation, product name: E3500); thus the measurement sample was prepared. Next, this measurement sample was observed with the microscope. The sectional image obtained through the observation was taken into the image processing software. The area of the cross section of the primary particle was calculated through the image information processing. Specifically, the calculation was conducted as below. The measurement sample was observed at a magnification of 5000 using the electron microscope. The sectional image of the NCM positive electrode active material particle obtained through the observation was recorded. From this recorded sectional image, the primary particle area of the NCM positive electrode active material particle was obtained using the image processing software ImageJ (30 secondary particles were selected randomly, the area of the individual primary particle included in each secondary particle was obtained, and then the average value of the 30 secondary particles was calculated).

Figure 3:
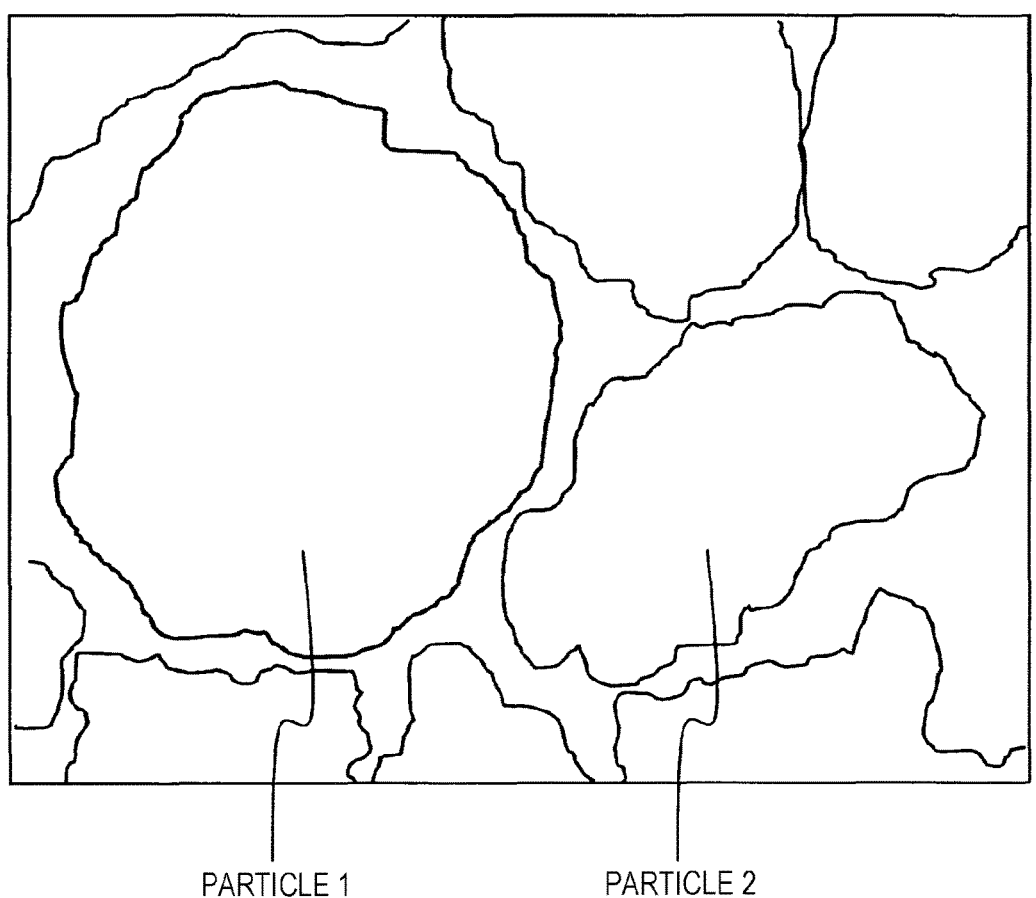
FIG. 3 is a schematic view illustrating a sectional image of a positive electrode manufactured in Example 1.
Figure 4:
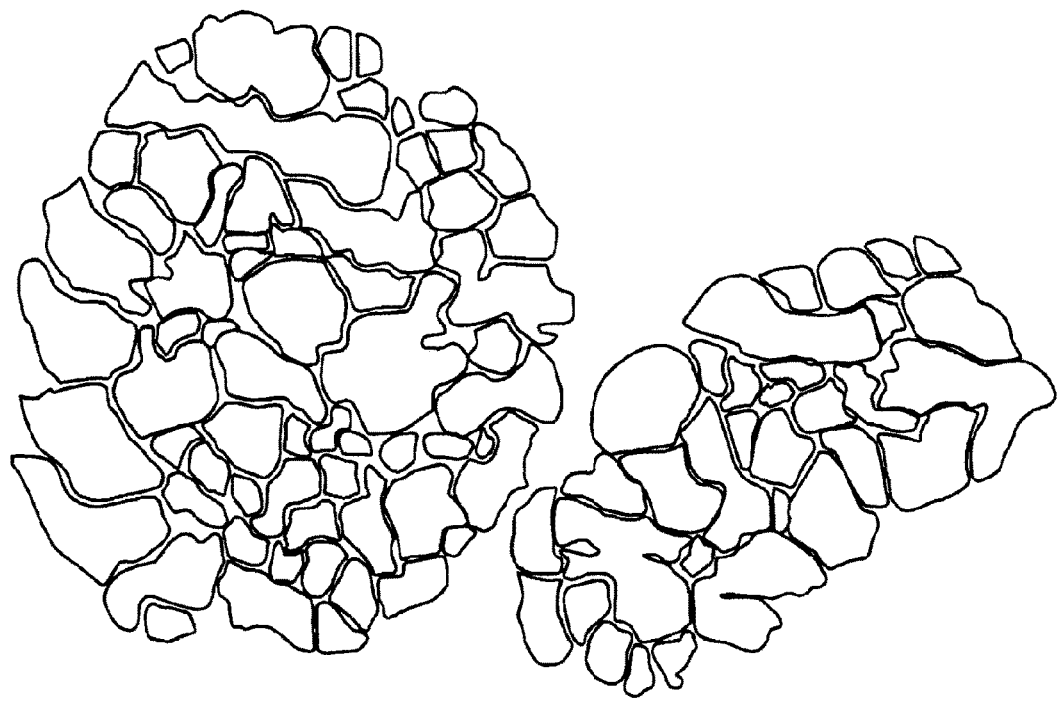
FIG. 4 is a diagram illustrating an outline of each primary particle included in secondary particles corresponding to particle 1 and particle 2 in FIG. 3.

FIG. 3 schematically shows the sectional observation image. FIG. 4 shows the outline of each primary particle included in the secondary particles (two secondary particles) shown as particle 1 and particle 2 in FIG. 3.

In this cross-section observation, the size of the primary particle inside the secondary particle, which cannot be observed from the outside, can be measured. For this reason, the value closer to the actual size of the primary particle can be obtained, which is different from the method in which the primary particle size is estimated by observing the external appearance of the secondary particle instead of presenting the cross section. The primary particle sectional area in Examples 1 and 2 and Comparative Examples 1 and 2 in Table 1 was obtained by using the positive electrode. Specifically, the positive electrode was extracted by decomposing the battery after 500 charging and discharging cycles at 55° C., and then the primary particle sectional area was obtained by presenting the cross section, acquiring the sectional image, and processing the image through the above procedure. The size of the primary particle is considered hardly changed before and after the cycle test.

TABLE 1

| | Primary particle area ($\mu m^2$) | Lattice constant "a" (Å) | Lattice constant "c" (Å) | Unit lattice volume (Å$^3$) | Capacity retention (%) after 500 cycles at 55° C. |
|---|---|---|---|---|---|
| Example 1 | 0.80 | 2.867 | 14.232 | 101.31 | 82 |
| Example 2 | 1.07 | 2.870 | 14.238 | 101.56 | 75 |
| Comparative Example 1 | 2.37 | 2.869 | 14.232 | 101.45 | 58 |
| Comparative Example 2 | 1.32 | 2.871 | 14.244 | 101.68 | 55 |

As is clear from the comparison between Examples 1 and 2 and Comparative Example 1, when the primary particle area is too large over 1.50 $\mu m^2$ (Comparative Example 1), the capacity retention is much lower than that in Examples 1 and 2. As is clear from the comparison between Examples 1 and 2 and Comparative Example 2, when the lattice constant "c" is too large over 14.240 Å$^3$ (or moreover the unit lattice volume is more than 101.60 Å$^3$) (Comparative Example 2), the capacity retention is much lower than that of Examples 1 and 2. The results of evaluating Examples indicate that the cycle characteristics can be improved by using the NCM positive electrode active material with the particular primary particle area and lattice constant (or additionally the particular unit lattice volume) as the positive electrode active material.

Not the wound type but the stacked battery is employed in any of Examples 1 and 2 and Comparative Examples 1 and 2. The decrease in cycle characteristics as observed in Comparative Examples 1 and 2 tends to be more remarkable in the stacked battery than in the wound battery. This tendency is considered to be based on the following: the electrodes in the stacked battery press each other with a smaller force, so that the crack of the particle in the NCM positive electrode active material deteriorates the positive electrode structure more easily and this makes it difficult to retain the capacity. According to the embodiment of the present disclosure, even the secondary battery with the stacked type can have the excellent cycle characteristics. Therefore, the battery can be thinned by the use of the stacked electrode. In general, if the laminate film is used as the package of the wound type, the force of the package container to press the electrode is relatively weak. Therefore, the deterioration in the positive electrode structure in the occurrence of the crack in the active material particle may be promoted. Even in this case, the structure of the present disclosure can provide the effect of the embodiment of the present disclosure.

Actually, in the observation of the cross section of the positive electrode active material particle after the charging and discharging cycle test, more cracks were observed inside the secondary particle in Comparative Examples 1 and 2 than in Examples 1 and 2. Observing the cross section of the particle enables the observation of the small crack and the crack that is hardly seen from the outside of the particle. The crack of the particle observed in Comparative Examples 1 and 2 was supposedly caused because the deformation by the stress in the secondary particle can no longer be suppressed from the outside. This is because the force of the package container to press the electrode body is weak as the laminate film is used as the package.

The reason why the effect by the positive electrode active material particle according to the embodiment of the present disclosure is obtained is not clear. However, the possible reasons are as below. The change in size of the primary particle affects the internal stress and the crack of the secondary particle. It is considered that the primary particle closer to the center of the secondary particle has a larger influence. As the primary particle is smaller, each primary particle in the secondary particle expands and contracts in the more random direction. Therefore, the internal stress of the secondary particles is diffused as appropriate and this makes the secondary particle crack less easily. In the charging and discharging, the crystal structure of the NCM positive electrode active material expands and contracts by the intercalation and deintercalation of lithium ions. When the unit lattice forming the crystal structure is small, the covalent bond between the transition metal and oxygen is short. This indicates that the binding energy between the transition metal and oxygen is high. Therefore, it is considered that the stability of the crystal with the small unit lattice is higher and such a crystal cracks less easily.

The nonaqueous electrolyte secondary battery according to the embodiment of the present disclosure may be any of the following first to seventh nonaqueous electrolyte secondary batteries.

The first nonaqueous electrolyte secondary battery is a laminate exterior battery including a positive electrode, which includes a positive electrode current collector and a positive electrode active material layer formed on the positive electrode current collector, a negative electrode, which includes a negative electrode current collector and a negative electrode active material layer formed on the negative electrode current collector, a separator between the positive electrode and the negative electrode, an electrolyte solution, and a laminate film package container. An electrode body including the positive electrode, the separator, and the negative electrode is housed in the laminate film package container. The positive electrode active material layer includes a secondary particle formed by a group of primary particles of a lithium nickel cobalt manganese composite oxide with a layered crystal structure. The primary particle has a cross-sectional area of 1.50 $\mu m^2$ or less. The layered crystal structure has a lattice constant "c" of 14.240 Å or less.

The second nonaqueous electrolyte secondary battery according to the present disclosure is the first nonaqueous electrolyte secondary battery configured such that the primary particle has a cross-sectional area of 0.30 $\mu m^2$ or more.

The third nonaqueous electrolyte secondary battery is the first or second nonaqueous electrolyte secondary battery configured such that the layered crystal structure has a lattice constant "c" of 14.226 Å or more.

The fourth nonaqueous electrolyte secondary battery is any of the first to third nonaqueous electrolyte secondary batteries configured such that the layered crystal structure has a unit lattice volume of 101.60 Å$^3$ or less.

The fifth nonaqueous electrolyte secondary battery is the fourth nonaqueous electrolyte secondary battery configured such that the layered crystal structure has a unit lattice volume of 101.20 Å$^3$ or more.

The sixth nonaqueous electrolyte secondary battery is any of the first to fifth nonaqueous electrolyte secondary batteries configured such that the lithium nickel cobalt manganese composite oxide is represented by the following Formula (1):

$$Li_{1-x}Ni_aCo_bMn_cO_2 \quad (1)$$

(where "x" satisfies $0 \leq x \leq 1$, "a" satisfies $0.4 \leq a \leq 0.8$, "b" satisfies $0.1 \leq b \leq 0.4$, and "c" satisfies $0.1 \leq c \leq 0.5$.)

The seventh nonaqueous electrolyte secondary battery is any of the first to sixth nonaqueous electrolyte secondary batteries configured such that the electrode body includes a positive electrode flat plate as the positive electrode and a negative electrode flat plate as the negative electrode.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A nonaqueous electrolyte secondary battery comprising:
    an electrode body;
    an electrolyte solution; and
    a laminate film package container housing the electrode body and the electrolyte solution, wherein
        the laminate film package comprises a metal layer, a heat-seal layer, and a protective layer;
        the electrode body includes a positive electrode, a negative electrode, and a separator disposed between the positive electrode and the negative electrode,
        the positive electrode includes a positive electrode current collector, and a positive electrode active material layer formed on the positive electrode current collector,
        the negative electrode includes a negative electrode current collector, and a negative electrode active material layer formed on the negative electrode current collector,
        the positive electrode active material layer includes secondary particles of a lithium nickel cobalt manganese composite oxide,
        the secondary particle includes a group of primary particles of a lithium nickel cobalt manganese composite oxide with a layered crystal structure,
        the primary particle has an average cross-sectional area of 0.80 μm² or greater and 1.20 μm² or less,
        the layered crystal structure has a lattice constant "c" of 14.240 Å or less, and
        the lithium nickel cobalt manganese composite oxide is represented by the following Formula (1):

$$Li_{1-x}Ni_aCo_bMn_cO_2 \qquad (1)$$

wherein "x" satisfies 0≤x≤1, "a" satisfies 0.4≤a≤0.8, "b" satisfies 0.1≤b≤0.4, and "c" satisfies 0.1≤c≤0.5.

2. The nonaqueous electrolyte secondary battery according to claim 1, wherein the layered crystal structure has a lattice constant "c" of 14.226 Å or more.

3. The nonaqueous electrolyte secondary battery according to claim 1, wherein the layered crystal structure has a unit lattice volume of 101.60 Å³ or less.

4. The nonaqueous electrolyte secondary battery according to claim 3, wherein the layered crystal structure has a unit lattice volume of 101.20 Å³ or more.

5. The nonaqueous electrolyte secondary battery according to claim 1, wherein the electrode body includes a positive electrode flat plate as the positive electrode and a negative electrode flat plate as the negative electrode.

* * * * *